Sept. 3, 1957 O. E. WOLFF 2,804,812
PHOTOGRAPHIC APPARATUS INCLUDING FLUID-SPREADING
AND SHEET-ARRESTING MECHANISM
Filed Oct. 27, 1955 3 Sheets-Sheet 1

*Otto E. Wolff*
INVENTOR.

BY *Brown and Mikulka*
*and*
*Robert E. Corb*

ATTORNEYS

INVENTOR.
Otto E. Wolff
BY Brown and Mikulka
and
Robert E. Corb
ATTORNEYS

Sept. 3, 1957          O. E. WOLFF          2,804,812
PHOTOGRAPHIC APPARATUS INCLUDING FLUID-SPREADING
AND SHEET-ARRESTING MECHANISM
Filed Oct. 27, 1955          3 Sheets-Sheet 3

Otto E. Wolff
INVENTOR.

BY Brown and Mikulka
and
Robert E. Corb
ATTORNEYS

United States Patent Office 2,804,812
Patented Sept. 3, 1957

2,804,812

PHOTOGRAPHIC APPARATUS INCLUDING FLUID-SPREADING AND SHEET-ARRESTING MECHANISM

Otto E. Wolff, Weston, Mass., assignor to Polaroid Corporation, Cambridge, Mass., a corporation of Delaware Application October 27, 1955, Serial No. 543,046

23 Claims. (Cl. 95—89)

This invention relates to photographic apparatus wherein photographic sheet materials are advanced, and particularly to novel mechanism for distributing a liquid between two photographic sheets and arresting the advancement of said sheets.

Heretofore, photographic apparatus, such as cameras, for processing photographic sheet materials and particularly cameras of the manually operated type now well known in the art, have included means such as a pair of pressure-applying rolls between which a pair of sheets are advanced for distributing a liquid between the sheets, together with a separate mechanism for predeterminedly controlling or arresting the movement of the sheets. In a preferred form of camera of this type, the sheet materials are drawn through and from the camera manually and the arresting mechanism usually includes members adapted to engage alterations, such as perforations, in the surface of one of the sheets, and means for disengaging the members from the sheet when it is desired to continue the movement thereof.

An object of the present invention is to provide, in a photographic apparatus through which sheet materials are advanced, a novel device both for distributing a photographic fluid between a pair of superposed sheets and for arresting the movement of said sheets.

Other objects of the invention are: to provide a device of the above type for use with a pair of superposed sheets having enlarged sections of a thickness predeterminedly greater than the remaining substantially uniformly thick sections and comprising a pair of juxtaposed rolls resiliently urged toward one another and means limiting the separation of said rolls to define a gap of predetermined width through which said uniformly thick sections are movable for distributing a fluid between said sheets but of insufficient width to permit the passage of the enlarged sections of said sheets whereby movement of said sheets is arrested; and to provide a device of the above type wherein the means for limiting the spacing of said rolls can be manually reset following arrestment of said sheets to permit the movement of an enlarged section of said sheets between said rolls, and following movement of said section between said rolls, said means automatically limits the gap between the rolls to said predetermined width intended for distributing a fluid between the sheets and again arresting the movement of said sheets in response to the next successive enlarged section thereof.

Further objects of the invention are: to provide a device of the above type including a pair of pressure-applying rolls for spreading a liquid between two sheets at least one of which includes a liquid-carrying container and for arresting the movement of said sheets in response to the movement of the container into the bite of said rolls; to provide, in a device of the above type, means for limiting the spacing of said rolls so that a liquid-carrying container is movable between said rolls and its liquid contents are discharged from said container between said sheets; to provide a photographic device of the above type wherein said means for limiting the spacing between said rolls is adapted to space said rolls apart to permit the threading of said sheet materials between said rolls; and to provide a device of the above type which is of a simple and inexpensive construction and is positive in operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The mechanism of the present invention is particularly suitable for embodiment in photographic apparatus, such as a camera, wherein two elongated sheets of photographic material, one of which is photosensitive, are individually mounted and housed and are manually advanced from separate positions into superposed relation. The photosensitive sheet is moved through the camera intermittently to successive positions at which its movement is arrested, for example, from a supply means to an exposure position and thence into superposition with the other sheet in a processing position which may be exterior of the camera, or to a processing position within the camera and finally to a position exterior of the camera where access thereto may be had. The two sheets, during superposition and advancement into processing position, are moved between a pair of pressure-applying members for distributing between the sheets a processing fluid preferably releasably carried by one of the sheets. The present invention comprehends a single, simple mechanism for both distributing a processing fluid between a pair of superposed sheets and for arresting the movement of said sheets following advancement of a predetermined length thereof through the apparatus.

Figure 1:
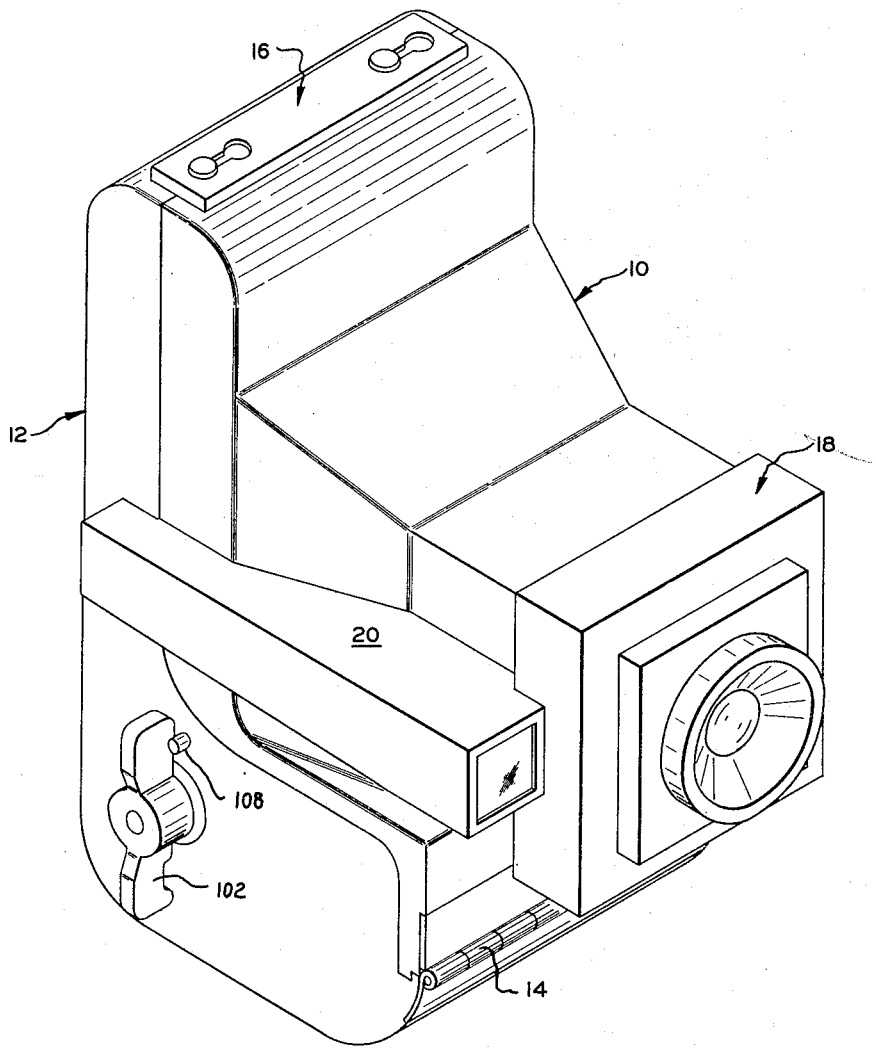
Figure 1 is a perspective view of one form of camera embodying the mechanism of the present invention.
Figure 2:
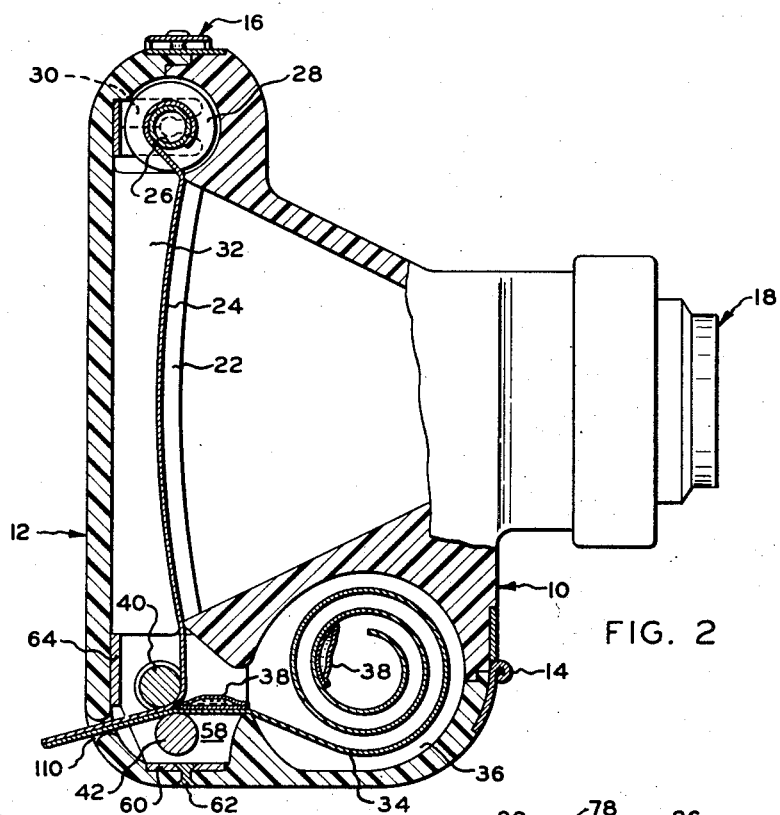
Fig. 2 is an elevational view of the camera of Fig. 1 shown partially in section and taken substantially midway between the sides of the camera.
Figure 3:
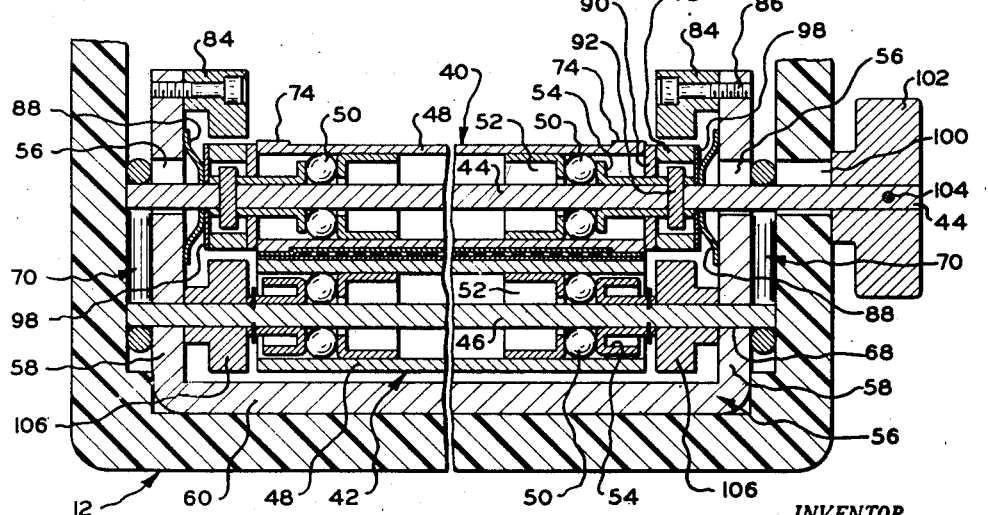
Fig. 3 is a sectional view of the mechanism of the invention.
Figure 5:
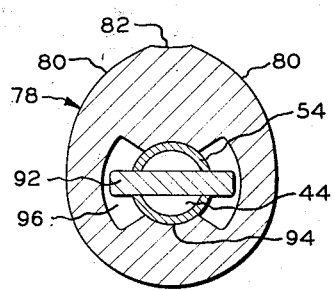
Fig. 5 is a sectional view of a cam comprising the mechanism of Fig. 3.

Reference is now made to Figs. 1 and 2 of the drawings wherein there is illustrated one form of camera incorporating the mechanism of the invention and showing the general relation of the components of the camera to the sheet materials employed therein. The camera comprises a forward casing section 10 and a rear casing section 12 pivotally mounted with respect to one another by a hinge 14 and with a latch 16 being provided at the end of the camera opposite the hinge for holding the two casing sections in closed position. Pivotal mounting of the two casing sections permits ready access therewithin for loading and threading the sheet materials used in the camera. The camera includes a lens and shutter assembly 18 of conventional design mounted on a tapered portion of forward casing section 10 and a view finder 20 is mounted on the exterior of the forward casing section. Section 10 may comprise, instead of the rigid construction shown, a forward reentrant section including an exposure aperture on which is mounted a bellows, in turn mounting the lens and shutter assembly. A pair of guide tracks 22 is provided at the rear of casing section 10 located on opposite sides of an exposure aperture for positioning frames of a photosensitive sheet for exposure.

A supply of photosensitive sheet material 24 is shown coiled on a conventional spool 26 mounted within a generally cylindrical chamber 28 formed by casing sections 10 and 12 and located at one end of said sections adjacent latch 16. Spool 26 includes a pair of stub shafts at opposite ends pivotally mounted between the arms of a U-shaped bracket 30 secured to rear casing section 12. Photosensitive sheet 24 is threaded from chamber 28 across guide tracks 22, where it is supported in position for exposure. Shoulders 32 are provided on the side walls of rear casing section 12 for holding sheet 24 against guide tracks 22 when the two casing sections are in closed position.

A supply of a second sheet 34 is provided in a preferably loose roll housed in a generally cylindrical chamber 36 formed by portions of casing sections 10 and 12 in the vicinity of hinge 14 at the end of the camera casing opposite chamber 28. The second sheet is adapted to be superposed with the exposed photosensitive sheet and the superposed sheets advanced between a pair of pressure-applying members for spreading a processing fluid in a thin layer between the sheets to form a sandwich. The photosensitive sheet includes a layer of photosensitive material, preferably an emulsion of a heavy metal salt such as a silver halide, in which a latent image may be attained by differential exposure to actinic light, and the second sheet is preferably adapted to serve as or to support an image-receptive layer in which a visible print of a latent image in the photosensitive layer may be produced. The processing composition, when spread in a uniformly thin layer between the photosensitive and second sheets, preferably effectuates a silver halide diffusion transfer-reversal process by which a latent image in the photosensitive sheet is developed and a positive print is produced within the sandwich preferably in or on the second sheet. Examples of the photographic materials useful in processes of the foregoing type are described in detail in Patent No. 2,543,181, issued to Edwin H. Land on February 27, 1951.

The processing fluid is carried, for example, in a succession of elongated rupturable containers 38 secured transversely and at regular intervals preferably to second sheet 34, one container being associated with an image-receiving area of the sheet. Each container 38 may comprise, for example, a rectangular section of sheet material, preferably of a multi-ply material, which is impervious to the processing fluid and vapor, folded longitudinally upon itself to form two walls which are bonded together at their margins to form a cavity. Containers of this type are more fully described in the aforementioned Land patent as well as Patents Nos. 2,634,886, issued April 14, 1953 and 2,653,732, issued September 29, 1953, both in the name of Edwin H. Land, and in Patent No. 2,674,532, issued April 6, 1954 to Norton T. Pierce. It is apparent that this container construction results in an increase in the thickness of the sheet materials in the region of the container over the thickness of the sheets in the regions between successive containers, and it is this variation in the thickness of the materials, which must pass between the pressure-applying members, which is utilized for arresting the movement of the sheets.

Reference is made to Figs. 2 through 8 of the drawings wherein there is illustrated in detail the mechanism of the invention for spreading the fluid in a layer between the photosensitive and second sheets and for arresting the movement of the sheets. The mechanism includes a pair of pressure-applying members, preferably elongated cylindrical rolls 40 and 42, pivotally mounted adjacent one another with their axes parallel within the rear casing section at the end of the casing opposite chamber 28, it being apparent that roll 42 may be omitted if desired and any type of rigid, nonpivotable member may be substituted therefor so long as it has a straight surface disposed adjacent roll 40. Rolls 40 and 42 are mounted for substantially free pivotal movement about a pair of elongated shafts, respectively, 44 and 46. Rolls 40 and 42 may be of any conventional construction such as solid rolls mounted on bushings or ball bearings or, for example, each roll may comprise, in the form shown, a cylindrical tube 48 pivotally mounted adjacent its ends on suitable bearings such as balls 50 and retained against axial movement by inner sleeves 52, having an L-shaped cross-section, and outer sleeves 54. Sleeves 52 are secured against axial movement within tube 48 to the walls thereof and sleeves 54 are secured against axial movement around the shafts (44 and 46) on which tubes 48 are mounted.

Rolls 40 and 42 and the means for mounting the rolls comprise a single unit secured within the camera to rear casing section 12. This unit comprises a generally U-shaped frame 56 having two parallel legs 58 joined by a transverse base section 60. Frame 56 may be secured at base section 60 to the end wall of casing section 12 by such means as rivets 62 and the frame may include, as shown, a second transverse section 64 which is disposed adjacent the rear wall of rear casing section 12. Shafts 44 and 46 are pivotally mounted adjacent their ends with their axes in a plane, shaft 44 being journaled in slots 66 formed in legs 58 so that it is movable toward and away from base section 60, and shaft 46 being journaled in a fixed position in holes 68 in legs 58. While it is not important that shaft 46 be pivotable, it is essential that shaft 44 be pivotable. Shafts 44 and 46 extend through and beyond legs 58 where they are engaged by springs 70 for urging roll 40 toward roll 42. In the form shown each spring 70 comprises a single, generally yoke-shaped, resilient element having a pair of legs 72 biased toward one another and curved at their ends so as to engage and extend partially around shafts 44 and 46.

The processing fluid is adapted to be spread in a uniformly thin layer between the sheets to form a sandwich during movement of the sheets between rolls 40 and 42. To insure a uniform spread of the fluid, one of the rolls, for example roll 40, is provided with raised shoulders 74 at its ends for spacing the rolls apart sufficiently to form a gap between the rolls which controls the thickness of the layer of liquid spread between the sheets. Shoulders 74 engage the sheets at their margins, permitting the intermediate portions of the sheets to separate slightly under hydraulic pressure generated in the fluid during movement between the rolls. This hydraulic pressure is generated in the fluid between the sheets by virtue of the fact that the spacing or gap between the intermediate sections of the rolls is substantially fixed during movement of the sheets and spreading of the fluid. The minimum gap is controlled by the thickness of the sheets and the height of shoulders 74 and the maximum gap is limited by means to be more fully described hereinafter. The sheets are drawn between the rolls manually, the rolls turning in response to friction between their surfaces and the surfaces of the sheets.

In the form of camera shown in the drawings the sandwich formed by sheets 24 and 34 and a layer of processing liquid therebetween is advanced directly from engagement with the rolls out of the camera through a slot 110 provided in rear section 12 of the casing adjacent the rolls. Premature exposure of the photosensitive layer of sheet 24 is prevented preferably by providing sheets 24 and 34 of a material, or with a coating, which is opaque to actinic light, and the processing fluid may include a dye or opaque material for preventing light from leaking between the sheets. In an alternative embodiment of the camera and sheets employed therein the rolls 40 and 42 may be provided without shoulders adjacent their ends and spacing strips may be provided between the margins of the sheets attached to one of said sheets for controlling the thickness of the layer of fluid, for preventing the fluid from escaping between the margins of the sheets during spreading and may also serve as light barriers.

In accordance with the present invention, means are provided for predeterminedly limiting the spacing between the rolls. In the form shown, this means comprises a pair of cams 78 keyed to shaft 44 adjacent the ends of roll 40. Each cam 78 includes a gradual rise generally designated at 80 from a low point or minor diameter to a comparatively short flat or concavity 82 located approximately 180° from the low point, whereupon it tapers off again to the aforementioned low point or minor diameter which, in the form shown, is substantially equal to the diameter of roll 40. A pair of fixed cam-engagement arms 84 are secured at the ends of legs 58 of frame 56 by such means as screws 86. Each engagement arm 84 is so positioned as to engage a cam 78 during its pivotal movement in a counterclockwise direction (viewing Figs. 6 through 8) at a predetermined point along rise 80 of the cam surface and thereby limits the movement of roll 40 away from roll 42.

Figure 6:
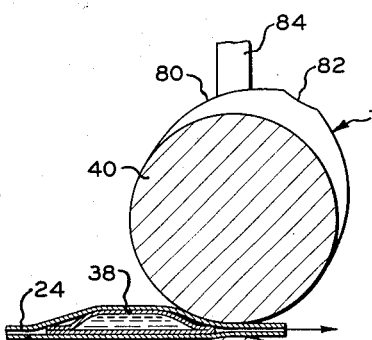
Figs. 6, 7 and 8 are sectional views of the rolls of the mechanism of Fig. 3, showing three positions of the cam, together with the sheet materials employed with the invention to illustrate its operation.
Figure 4:
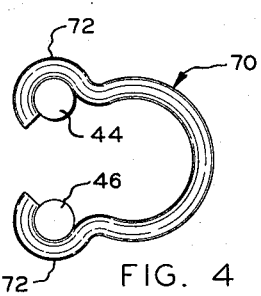
Fig. 4 is a view of one element of the mechanism of Fig. 3.

Reference is now made to Fig. 6 of the drawings wherein arm 84 is shown in engagement with rise 80 of cam 78 so as to position rolls 40 and 42 for spreading a fluid in a layer between sheets 24 and 34. As previously mentioned, the minimum width of the gap between the rolls is defined by the thickness of the sheets and the height of shoulders 74 on roll 40. This minimum gap is also the maximum gap for spreading a fluid between the sheets and is maintained by engagement of rise 80 of cam 78 with arm 84. At this fixed position of the rolls a container 38 or other means located between the sheets, due to its thickness, is unable to pass between the rolls and jams as it enters the bite of the rolls, causing movement of the sheets to be arrested. While the herein described structure is substantially rigid so as to arrest the movement of the sheets, a slight resiliency or "give" to the structure is desirable to allow for minor variations in the thickness of the sheets not intended to cause their movement to be arrested.

Figure 7:
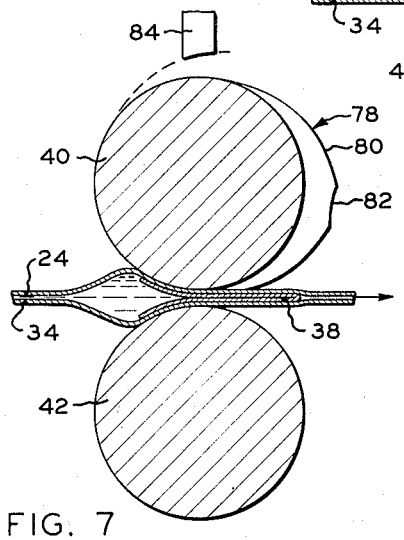
Figure 8:
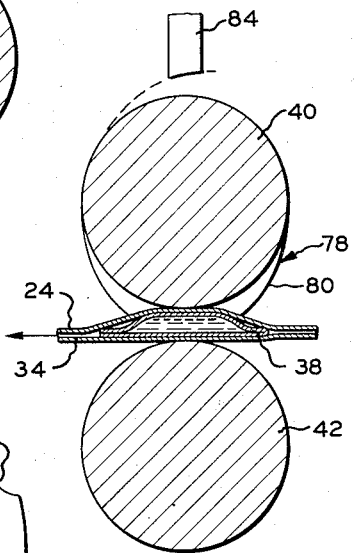

To reset the rolls to permit movement of container 38 between the rolls while compressive pressure is applied to the container for discharging its liquid contents between the sheets, each cam 78 is rotated as shown in Fig. 7 in a clockwise direction, thereby withdrawing rise 80 from engagement with arm 84 and locating the portion of the cam at its minor diameter for engagement with arm 84. The minor diameter of the cam and the location of the arm are such that rolls 40 and 42 may then be separated sufficiently to allow the passage of container 38 between the rolls, i. e., the gap is substantially equal to the combined thickness of sheets 24 and 34 and the collapsed container so that the fluid contents of the container are completely discharged therefrom between the sheets substantially in the manner shown in Fig. 7.

Cams 78 are reset by rotating them in a clockwise direction, preferably through about 90° or less, and, during movement of a container between the sheets, the cams automatically return to a position for again limiting the gap for spreading a fluid between the sheets. As the sheets in the region of a container are moved between the rolls, they cause roll 40 to be rotated in a counterclockwise direction which in turn causes the rotation of the cams until rises 80 thereof are engaged by arms 84.

To effect this rotation of cams 78, the cams are urged along shaft 44 toward the ends of roll 40, for example by resilient means such as coil springs or Belleville springs or dished washers 88 mounted on shaft 44 between the cams and legs 58. Cams 78 may be urged into direct frictional engagement with the ends of roll 40 or, as in the form shown, into engagement with washers 90 formed of a friction-generating material mounted on shaft 44 between the cams and the ends of the roll. Instead of resilient means, cams 78 may comprise permanent magnets having an attraction for the material comprising tube 48 or the tube itself may comprise a magnet adapted to attract the cams. The circumference of rolls 40 and 42 is such that a container is advanced completely between the rolls before movement of the cam is arrested and the gap is fixed by engagement of rise 80 with arm 84.

As heretofore mentioned, cams 78 are keyed to shaft 44 so that the cams rotate and can be rotated together. In the form shown, cams 78 are mounted on sections of sleeves 54 so that they are pivotable about the sleeves and are keyed to the shaft by pins 92 secured in holes 94 extending through shaft 44 and sleeves 54. Cams 78 are each provided with a loose-fitting keyway 96 which permits limited rotation of each cam independently of the shaft to which it is keyed. This pivotal movement of the cams independently of shaft 44 is important to insure engagement of the rise 80 of each cam with its respective arm 84 and thereby insure uniform spacing of the rolls throughout their length, i. e., to prevent the possibility of one cam engaging arm 84 before the other cam is likewise engaged and stopping the movement of the other cam prior to its engagement with its respective arm 84. Because of the large keyway necessitated by this arrangement and in order to reduce friction between cams 78 and Belleville springs 88, washers 98 may be provided between the cams and the Belleville springs. One end of shaft 44 is longer than the other end and extends exteriorly of the camera casing through a slot 100 in the casing where a manually engageable handle or crank 102 is keyed to the end of shaft 44 by such means as a pin 104, handle 102 enabling the operator of the camera to rotate the cams for resetting them. A light torsion type return spring (not shown) may be provided in association with shaft 44 to return it to its original position following resetting of the cams.

Since roll 40 is biased toward roll 42 by spring 70, it is important that means be provided for spacing rolls 40 and 42 apart to permit the threading of sheets 24 and 34 therebetween. In the present invention cams 78 are also adapted to this function and for this purpose shaft 46 is provided with a pair of cylindrical disks 106 pivotally mounted adjacent the ends of roll 42 in position to be engaged by cams 78. Disks 106 are of substantially uniform diameter, for example, equal to the diameter of roll 42, or, if it is desired, roll 42 may be extended in lieu of disks 106 with the ends performing the same function. To space the rolls apart each cam 78 is rotated by turning crank 102 in a counterclockwise direction until rise 80 of the cam surface engages disk 106, forcing the rolls apart, and dwell 82 comes to rest in engagement with disk 106. The flat or concavity 82 is provided on the cam so as to retain the rolls in their separated condition. So that the cams may not be rotated too far in a counterclockwise direction, a suitable stop member 108 may be provided on the exterior of the camera casing in position to engage handle 102 since it is unnecessary to rotate the came through more than approximately 180° and then only for spacing the rolls apart. Stop member 108 may also be so formed as to control the extent of rotation of the handle and cams during resetting.

The camera is adapted to be loaded by pivoting rear casing section 12 to an open position, inserting a spool of photosensitive sheet between the arms of bracket 30 in chamber 28, positioning a roll of second sheet 34 within chamber 36 and threading a leader connected to the leading ends of the two sheets between rolls 40 and 42, the latter being held apart by the engagement of cams 78 with disks 106. The cams may then be rotated to allow the rolls to come together under the bias of springs 70. Rear casing section 12 is then pivoted into closed position and the operator then grasps the leader extending between the rolls and through a passage 110 formed in the rear wall of casing section 12 for drawing the two sheets between the rolls until their movement is arrested by jamming of the first container 38 in the bite of the rolls. This positions the first frame of photosensitive sheet 24 for exposure and, following exposure, when it is desired to process the sheets, the operator merely turns the crank through approximately 150° and draws a sandwich from the camera until movement of the sheets is again arrested by jamming of the next successive container in the bite of the roll. The sandwich, which contains a photographic print, may be severed from the remaining portions of the sheets so as to leave a leader for drawing the next successive sandwich from the camera and the two sheets comprising the sandwich are maintained in superposition with a layer of processing fluid therebetween during a predetermined processing period, at the end of which the two sheets may be stripped apart.

Figure 10:
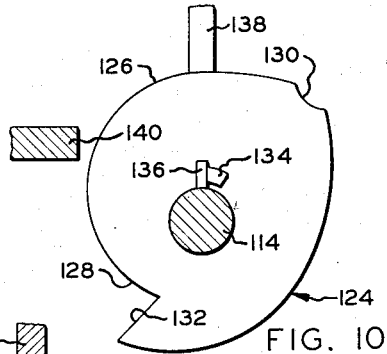
Fig. 10 is a view of the cam of the mechanism of Fig. 9.
Figure 9:
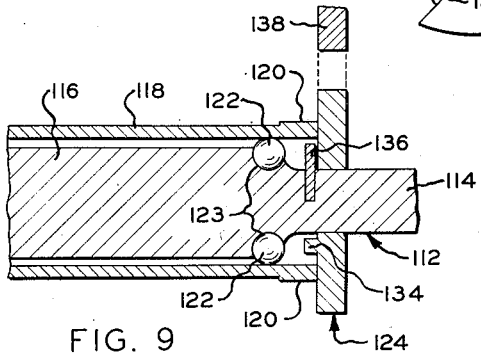
Fig. 9 is a view, similar to Fig. 1, of a portion of another embodiment of the mechanism of the invention.

Reference is now made to Figs. 9 and 10 of the drawings wherein there is illustrated another embodiment of the mechanism of the invention comprising a shaft 112, similar to shaft 44, and including end sections 114 of a diameter substantially equal, for example, to the diameter of shaft 44, and an intermediate section 116 of a greater diameter provided for strength and stiffness. The roll mounted on the shaft is substantially the equivalent of roll 40 and comprises a cylindrical tube 118 having raised shoulders 120 at its ends. Tube 118 is mounted for rotation about shaft 112 on ball bearings 122 secured in annular grooves 123 at the ends of the enlarged intermediate section 116 of the shaft.

A pair of cams 124 are provided on the end sections of shaft 112 and are substantially the equivalent in function to the above-described cams 78. Each cam 124 comprises a gradual rise indicated at 126 from a low point 128 to a flat or concavity 130 spaced approximately 180° from low point 128. The cam, instead of tapering off again to low point 128 as does cam 78, tapers to a diameter greater than the diameter at the low point and forms an abrupt shoulder 132 spaced approximately 180° from flat 130. Each cam 124 is keyed to shaft 112 in such a manner as to allow it to make almost one complete revolution with respect to the shaft. For this purpose each cam 124 is provided with a projection 134 extending in the direction of the axis of the shaft and adapted to engage a pin 136 extending radially from the shaft.

In the present embodiment there is provided two pairs of cam-engagement arms 138 and 140, each of arms 138 being secured to U-shaped frame 56 in position to engage a rise 126 of a cam 124 so as to limit the spacing of the rolls to the proper gap for spreading the liquid between the sheets. Arm 140 is mounted on forward casing section 10 in position to engage shoulder 132 of cam 124 and thereby arrest the rotary movement of the cam. Each engagement arm 140 is positioned adjacent the surface of cam 124 and spaced approximately 90° from arm 138 and, in this position, each arm allows the rotation of a cam 124 in a clockwise direction, viewing Fig. 10, only to the extent that flat 130 engages a disk 106 for spacing the rolls apart. By virtue of this arrangement the rolls can only be spaced apart by the cams when the rear casing section is pivoted to an open position and arm 140 is withdrawn from its position adjacent cam 124. It is to be noted that shoulder 132 and cam-engagement arm 138 are so arranged that arm 138 arrests the clockwise rotation of cam 124 when the flat 130 is in engagement with a disk 106, thereby preventing the movement of cam 124 past this position.

While the liquid-spreading and sheet-arresting mechanism has been shown embodied in a particular type of camera from which the sheets are adapted to be withdrawn during processing, it is to be understood that such a showing is intended for purposes of illustration and that the mechanism may be readily incorporated, either with or without modification, into any type of photographic apparatus or camera and, for example, may be incorporated into a camera of the type disclosed in Patent No. 2,455,111, granted to J. F. Carbone et al. on November 30, 1948.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic device for distributing a fluid between a pair of superposed photographic sheets and for arresting the movement of said sheets, said device comprising, in combination, a roll, a rigid member, engagement means, means for mounting said roll in juxtaposition with said rigid member and for pivotal movement in response to movement of said sheets between said rigid member and said roll in frictional engagement with said roll, the last-named means mounting said roll and said engagement means together and for movement toward and away from said rigid member, spring means urging said roll and said engagement means toward said rigid member so that said roll is retained in frictional engagement with said sheets, elements fixed with respect to the aforementioned means for mounting said roll for cooperating with said engagement means to predeterminedly limit the movement of said roll away from said rigid member, and means for moving said engagement means independently of said roll so as to permit the movement of said roll away from said rigid member.

2. A photographic device for distributing a fluid between a pair of superposed photographic sheets and for arresting the movement of said sheets, said device comprising, in combination, a pair of substantially rigid pressure-applying members, means for mounting one of said members in juxtaposition with the other of said members and for pivotal movement in response to movement of said sheets between said members in frictional engagement with said one member, the last-named means mounting said one member for movement toward and away from said other member, spring means urging said members toward one another so that said one member is retained in frictional engagement with said sheets, engagement means mounted coaxially with said one member and pivotable independently thereof, elements fixed with respect to the aforementioned means for mounting said one member for engaging said engagement means so as to predeterminedly limit the movement of said one member away from said other member, and means for pivoting said engagement means independently of said one member so as to permit the movement of said one member away from said other member.

3. A photographic device for distributing a fluid between a pair of superposed photographic sheets and for arresting the movement of said sheets, said device comprising, in combination, a roll, a rigid member having a straight surface portion, means for mounting said roll in juxtaposition with said rigid member and for pivotal movement in response to movement of said sheets between said rigid member and said roll in frictional engagement therewith, the last-named means mounting said roll for movement toward and away from said rigid member, spring means urging said roll toward said rigid member so that said roll is retained in frictional engagement with said sheets, engagement means mounted coaxially with said roll and pivotable independently of said roll, elements fixed with respect to the aforementioned means for mounting said roll, said engagement means cooperating with said elements for predeterminedly limiting the movement of said roll away from said rigid member, and manually operable means for so pivoting said engagement means independently of said roll as to permit the movement of said roll away from said rigid member.

4. A photographic device for distributing a fluid between a pair of superposed photographic sheets and for arresting the movement of said sheets, said device comprising, in combination, a pair of rolls, means for so mounting said rolls in juxtaposition that they are pivoted in response to movement of said sheets between said rolls in frictional engagement therewith, the last-named means mounting one of said rolls for movement toward and away from the other of said rolls, spring means urging said one roll toward said other roll so that said rolls are retained in frictional engagement with said sheets, engagement means mounted coaxially with said one roll and pivotable independently of said one roll, members fixed with respect to the aforementioned means for mounting said rolls, said engagement means cooperating with said members for predeterminedly limiting the movement of said one roll away from said other roll, and manually operable means for so pivoting said engagement means independently of said one roll as to permit the movement of said one roll away from said other roll.

5. In photographic apparatus wherein photographic sheet materials are processed and through which said sheet materials are advanced, means for distributing a fluid between a pair of superposed sheets and for arresting the movement of said sheets, said means comprising a roll, a rigid member having a substantially straight surface portion, said roll being mounted in juxtaposition with said rigid member and with its axis substantially parallel with said surface portion of said rigid member and for rotary movement in response to movement of said sheets between said rigid member and said roll in frictional engagement with the latter, means mounting said roll for movement toward and away from said rigid member so that the width of the gap between said roll and said rigid member is variable, means resiliently urging said roll toward said rigid member so that said roll is retained in frictional engagement with said sheets, at least one cam coaxially mounted with said roll adjacent an end thereof, said cam being mounted for movement independently of said roll and being urged into frictional engagement with said roll, at least one element fixed with respect to the aforesaid means for mounting said roll and located in position to so engage portions of said cam during pivotal movement thereof as to limit movement of said roll away from said rigid member, and manually operable means for so rotating said cam from engagement with said element as to permit the spacing apart of said roll from said rigid member.

6. The photographic apparatus of claim 5 wherein said means for distributing a fluid between a pair of superposed sheets and for arresting the movement of said sheets comprises a pair of cams coaxially mounted with said roll adjacent opposite ends thereof, said cams being coupled with one another, being pivotable independently of said roll and being urged into frictional engagement with the ends of said roll, a pair of elements fixedly located with respect to said means for mounting said roll in position to engage portions of said cams during pivotal movement thereof so as to limit movement of said roll away from said rigid member, and wherein said manually operable means so rotate said cams from engagement with said fixed elements as to permit said roll to be spaced apart from said rigid member.

7. In a photographic apparatus wherein photographic sheet materials are processed and through which said sheet materials are advanced, means for distributing a fluid between a pair of superposed sheets and for arresting the movement of said sheets, said means comprising a pair of juxtaposed rolls mounted with their axes substantially parallel for rotary movement in response to movement of said sheets between said rolls in frictional engagement therewith, means mounting one of said rolls for movement toward and away from the other of said rolls so that the width of the gap between said rolls is variable, means resiliently urging said one roll toward said other roll so that said rolls are retained in frictional engagement with said sheets, at least one cam coaxially mounted with said one roll adjacent an end thereof, said cam being mounted for movement independently of said one roll and being urged into frictional engagement with said one roll, at least one member fixed with respect to the aforesaid means for mounting said rolls and located in position to so engage portions of said cam during pivotal movement thereof as to limit movement of said one roll away from said other roll, and manually operable means for so rotating said cam from engagement with said member as to permit the separation of said rolls.

8. The photographic apparatus of claim 7 wherein said means for distributing a fluid between a pair of superposed sheets and for arresting the movement of said sheets comprises a pair of cams coaxially mounted with said one roll adjacent opposite ends thereof, said cams being coupled with one another, pivotable independently of said one roll and being urged into frictional engagement with the ends of said one roll, a pair of members fixedly located with respect to said means for mounting said rolls in position to engage portions of said cams during pivotal movement thereof so as to limit movement of said one roll away from said other roll, and wherein said manually operable means so rotate said cams from engagement with said fixed members as to permit the separation of said rolls.

9. The photographic apparatus of claim 7 wherein said cam comprises a permanent magnet and is magnetically attracted into frictional engagement with said roll.

10. The photographic apparatus of claim 7 wherein spring means are provided for urging said cam into frictional engagement with said roll.

11. A photographic device for distributing a fluid between a pair of superposed photographic sheets and for arresting the movement of said sheets, said device comprising, in combination, a pair of elongated pressure-applying rolls, means mounting said rolls in juxtaposition with their axes substantially in a plane for rotary movement in response to movement of said sheets between said rolls in frictional engagement therewith, the last-named means mounting one of said rolls for movement in said plane toward and away from the other of said rolls so that the width of the gap between said rolls is variable, spring means for urging said one roll toward said other roll so as to retain said rolls in frictional engagement with said sheets, a pair of cams coaxially mounted with said one roll adjacent opposite ends thereof, said cams being coupled with one another and being pivotable together independently of said one roll, means for causing the frictional engagement of said cams with said one roll for causing the rotation of said cams in response to rotation of said one roll, a pair of members fixedly located with respect to the aforementioned means for mounting said rolls substantially in said plane in position to engage portions of said cams and thereby limit the width of the gap between said rolls, and manually operable means for rotating said cams independently of said one roll from engagement with said fixed members to permit the separation of said rolls.

12. The photographic device of claim 11 wherein said one roll includes raised cylindrical shoulders at its ends for predeterminedly spacing apart the intermediate sections of said rolls.

13. The photographic device of claim 11 wherein said one roll is pivotally mounted on an elongated shaft for movement independently of said shaft, said shaft is mounted for pivotal movement and said cams are keyed to said shaft.

14. The photographic device of claim 13 wherein said cams are loosely keyed to said shaft so as to permit limited pivotal movement of said cams with respect to each other and said shaft.

15. The photographic device of claim 11 comprising a second pair of members fixedly mounted with respect to said means for mounting said rolls, each of said second pair of members being located substantially in said plane adjacent an end of said other roll in position to be engaged by one of said cams during pivotal movement of said cams, each of said cams being so formed as to coact with one of said second pair of members for spacing said one roll apart from said other roll.

16. A photographic device for distributing a fluid between a pair of superposed photographic sheets and for arresting the movement of said sheets, said device comprising, in combination, a pair of elongated cylindrical rolls, means for mounting said rolls in juxtaposition with their axes substantially in a plane, the last-named means mounting one of said rolls for movement in said plane toward and away from the other of said rolls so that the spacing between said rolls is variable, said rolls being mounted for rotary movement in response to movement of said sheets between said rolls in frictional engagement therewith, spring means urging said one roll toward said other roll so as to retain said rolls in frictional engagement with said sheets, a pair of cams mounted coaxially with said one roll adjacent opposite ends thereof, said cams being coupled with one another and being pivotable independently of said one roll, spring means urging said cams axially into frictional engagement with said one roll whereby said cams are pivoted in response to rotation of said one roll during movement of said sheets between said rolls, a pair of members fixedly mounted with respect to said means for mounting said rolls, each of said members being located substantially in said plane in position to engage a portion of one of said cams and thereby limit the spacing between said rolls, and manually operable means for rotating said cams independently of said one roll from engagement with said members to permit the movement of said one roll apart from said other roll.

17. In a photographic apparatus wherein photographic sheet materials are processed and through which said sheet materials are moved, means for distributing a fluid between a pair of superposed photographic sheets and for arresting the movement of said sheets, the last-named means comprising a pair of elongated cylindrical rolls, means mounting said rolls in juxtaposition with their axes substantially in a plane, the last-named means mounting one of said rolls for movement in said plane toward and away from the other of said rolls, said rolls being mounted for rotary movement in response to movement of said sheets between said rolls in frictional engagement therewith, spring means urging said one roll toward said other roll so as to retain said rolls in frictional engagement with said sheets, a pair of cams mounted coaxially with said one roll adjacent opposite ends thereof, said cams being coupled with one another and being pivotable together independently of said one roll, a pair of members fixedly located with respect to said means for mounting said rolls, each of said members being located substantially in said plane in position to engage one of said cams when the latter are in a first position for limiting the movement of said one roll away from said other roll, manually operable means for pivoting said cams independently of said one roll to a second position wherein said one roll is movable away from said other roll, and means for so urging said cams axially into frictional engagement with said one roll that said cams are pivoted in response to rotation of said one roll due to movement of said sheets between said rolls from said second position to said first poition.

18. A photographic device for distributing a fluid between a pair of superposed photographic sheets and for arresting the movement of said sheets, said device comprising, in combination, a pair of elongated cylindrical rolls, means for mounting said rolls in juxtaposition with their axes substantially in a plane, the last-named means mounting one of said rolls for movement in said plane toward and away from the other of said rolls, said rolls being mounted for rotary movement in response to movement of said sheets between said rolls in frictional engagement therewith, spring means for urging said one roll toward said other roll so as to retain said rolls in frictional engagement with said sheets, a pair of cams mounted coaxially with said one roll adjacent opposite ends thereof, said cams being coupled with one another and being pivotable independently of said one roll, spring means so urging said cams axially into frictional engagement with said one roll that said cams are pivoted in a first direction in response to rotation of said rolls during movement of said sheets therebetween, each of said cams having at least one rise of predetermined slope, a pair of members fixedly located with respect to said means for mounting said rolls, each of said members being located substantially in said plane in position to engage the rise of one of said cams during pivotal movement of said cams in said first direction and thereby limit the movement of said one roll away from said other roll, and manually operable means for so rotating said cams independently of said other roll in the other direction that said rise of each of said cams is disengaged from one of said members so as to permit the movement of said one roll apart from said other roll.

19. The photographic device of claim 18 wherein one of said rolls includes raised cylindrical shoulders at its ends for predeterminedly spacing apart the intermediate sections of said rolls.

20. The photographic device of claim 18 wherein said one roll is pivotally mounted on an elongated shaft for rotary movement independently of said shaft, said shaft is mounted for pivotal movement and said cams are keyed to said shaft.

21. The photographic device of claim 20 wherein said cams are loosely keyed to said shaft so as to permit limited pivotal movement of said cams with respect to each other and said shaft.

22. The photographic device of claim 18 comprising a second pair of members fixedly mounted with respect to said means for mounting said rolls, each of said second pair of members being located substantially in said plane adjacent an end of said other roll in position to be engaged by a rise on one of said cams during pivotal movement of said cams in said other direction, each of said cams being so formed as to coact with one of said second pair of members for spacing said one roll part from said other roll.

23. A photographic device for distributing a fluid between a pair of superposed photographic sheets and for arresting the movement of said sheets, said device comprising, in combination, a pair of elongated shafts, a pair of laterally spaced frame members pivotally mounting said shafts adjacent their ends with their axes in a plane, one of said shafts being so journaled in slots in said frame members that it is movable toward and away from the other of said shafts, a pair of elongated cylindrical rolls mounted on said shafts for rotary movement independently of said shafts, said rolls being mounted for rotary movement in response to movement of said sheets between said rolls in frictional engagement therewith, spring means coupled with said one shaft for urging it toward said other shaft so as to retain said rolls in frictional engagement with said sheets, a pair of cams mounted on said one shaft adjacent the ends of one of said rolls, said cams being loosely keyed to said one shaft so as to be free for axial movement and limited rotary movement with respect to said one shaft, a pair of springs mounted on said one shaft between said one roll and said frame members for so urging said cams axially into frictional engagement with said one roll that said cams are pivoted in a first direction in response to rotation of said rolls during movement of said sheets therebetween, each of said cams having a rise of predetermined slope, a pair of engagement members fixedly mounted on said frame members, each of said engagement members being located substantially in a plane on the side of said one shaft opposite said other shaft in position to engage the rise of one of said cams during rotation of said cams in said first direction and thereby limit the movement of said one shaft away from said other shaft, manually engageable means coupled with said one shaft for so rotating said cams independently of said one roll in a second direction that said rise of each of said cams is disengaged from one of said engagement members, permitting the movement of said one shaft in said plane away from said other shaft, and a pair of engageable elements mounted on said other shaft adjacent the ends of said other roll, each of said engageable elements being positioned for engagement by the rise of one of said cams during rotation of said one shaft in said second direction, said cams being so formed as to coact with said engageable elements for spacing said one shaft away from said other shaft.

References Cited in the file of this patent

UNITED STATES PATENTS

| | | |
|---|---|---|
| 2,477,304 | Land | July 26, 1949 |
| 2,638,828 | Bachelder et al. | May 19, 1953 |